United States Patent
Jaworski et al.

(10) Patent No.: US 11,368,326 B2
(45) Date of Patent: Jun. 21, 2022

(54) METHOD AND SYSTEM FOR INTEGRATING DATA POINTS INTO A BUILDING CONTROLLER OF A BUILDING AUTOMATION SYSTEM

(71) Applicant: Siemens Schweiz AG, Zürich (CH)

(72) Inventors: Steven T. Jaworski, Grayslake, IL (US); Robert L. Kalafut, Downers Grove, IL (US)

(73) Assignee: Siemens Schweiz A G, Zürich (CH)

( * ) Notice: Subject to any disclaimer, the term of this patent is extended or adjusted under 35 U.S.C. 154(b) by 110 days.

(21) Appl. No.: 16/145,938

(22) Filed: Sep. 28, 2018

(65) Prior Publication Data

US 2020/0106634 A1 Apr. 2, 2020

(51) Int. Cl.
*H04L 12/28* (2006.01)
*G06F 3/04847* (2022.01)
*H04L 67/125* (2022.01)

(52) U.S. Cl.
CPC ...... *H04L 12/2812* (2013.01); *G06F 3/04847* (2013.01); *H04L 12/2809* (2013.01); *H04L 12/2825* (2013.01); *H04L 12/2834* (2013.01); *H04L 67/125* (2013.01)

(58) Field of Classification Search
None
See application file for complete search history.

(56) References Cited

U.S. PATENT DOCUMENTS

| 2010/0138007 | A1 | 6/2010 | Clark et al. | |
|---|---|---|---|---|
| 2012/0005326 | A1* | 1/2012 | Bradetich | H04L 12/10 709/223 |
| 2013/0086066 | A1* | 4/2013 | Anderson, Jr. | H04L 12/2807 707/737 |
| 2015/0277406 | A1* | 10/2015 | Maturana | G06F 9/451 700/83 |
| 2019/0235455 | A1* | 8/2019 | Michals | G05B 19/042 |
| 2019/0391546 | A1* | 12/2019 | Jundt | G05B 19/0426 |

FOREIGN PATENT DOCUMENTS

WO 2008094864 A2 8/2008

OTHER PUBLICATIONS

PCT International Search Report and Written Opinion of International Searching Authority dated Jan. 29, 2020 corresponding to PCT International Application No. PCT/EP2019/074598 filed Sep. 13, 2019.

* cited by examiner

*Primary Examiner* — Sean Shechtman

(57) ABSTRACT

A method for integrating data points of building automation devices into a building controller within a building automation system includes generating on a display an identification of a system object relating to one of a plurality of building automation devices; receiving a user input comprising a filter criterium for filtering a plurality of data points relating to the building automation devices; identifying at least one of the plurality of data points of the building automation devices based on the filter criterium; integrating the identified at least one of the data points into the building controller to be associated with the system object; and generating on the display an identification of at least one of the integrated data points associated with the system object.

17 Claims, 5 Drawing Sheets

METHOD AND SYSTEM FOR INTEGRATING DATA POINTS INTO A BUILDING CONTROLLER OF A BUILDING AUTOMATION SYSTEM

BACKGROUND

1. Field

Aspects of the present disclosure generally relate to the technical field of building management systems and building automation systems comprising a plurality of building automation devices. Specifically, the present disclosure relates to a method and a system for integrating data points of one or more building automation devices into a building controller within a building automation system.

2. Description of the Related Art

A building automation system, herein also referred to as BAS, is an arrangement for monitoring, open-loop and/or closed-loop control of process variables in complex technical systems in a building or in a campus comprising multiple buildings. A BAS typically operates heating, ventilation and air-conditioning systems, lighting and shading devices and also access control, security and fire surveillance systems. In the BAS, process variables, such as room air-conditioning variables or events, are detected, evaluated, monitored, influenced or generated. The energy consumption of the building or campus may also be optimized by the BAS.

Generally, a BAS encompasses and operates a plurality of field devices, herein also referred to as BAS devices, such as sensors and actuators. Examples of typical field devices are temperature and humidity sensors, air quality sensors, pressure sensors, flow meters, electricity meters, heat meters, brightness sensors, fire alarms, intrusion alarms, alarm or sprinkler devices, drives for hot water valves, thermostat valves, ventilation flaps or blinds, light switches, smart card readers or devices for detecting biometric data. Further, the BAS typically comprises a plurality of software modules, processes or programs, and in general a number of computers or processors and also a plurality of open-loop and/or closed-loop control devices, herein also referred to as building controller(s) or automation station(s). Further devices may include for example devices for linking the building automation system to external communication networks and graphical user interfaces for display and analysis of captured signals, video and data from monitored and/or controlled points or elements within the building automation system.

Building controllers or automation stations are essentially purpose-built computers with input and output capabilities. Inputs allow a controller to read temperature, humidity, pressure, current flow, air flow, and other essential factors. The outputs allow the controller to send command and control signals to slave devices, e.g., field devices such as sensors and actuators, and to other parts of the system. Inputs and outputs can be either digital or analog. Building controllers may be grouped in programmable logic controllers (PLCs), system/network controllers, and terminal unit controllers.

Data points from devices being monitored, such as for example an air-conditioning unit with sensor(s) or actuators for lighting, must be integrated to the operating and monitoring device, e.g., building controller or an automation station, so that the building controller or automation station can monitor and control the air-condition unit or lighting actuator. Previous methods to integrate data points to a building controller for monitoring and controlling purposes required an engineer or technician to manually select data points of a device via a software tool interface provided for commissioning purposes. Thus, there may exist a need for an improved system and method for integrating data points in a building controller.

SUMMARY

A first aspect of the present disclosure provides a method for integrating data points of building automation devices into a building controller within a building automation system, comprising, through operation of at least one processor in a building automation system configured via executable instructions included in at least one memory, generating on a display an identification of a system object relating to one of a plurality of building automation devices; receiving a user input comprising a filter criterium for filtering a plurality of data points relating to the building automation devices; identifying at least one of the plurality of data points of the building automation devices based on the filter criterium; integrating the identified at least one of the data points into the building controller to be associated with the system object; and generating on the display an identification of at least one of the integrated data points associated with the system object.

A second aspect of the present disclosure provides a system for integrating data points of building automation devices into a building controller within a building automation system comprising a storage device comprising an application; an accessible memory comprising instructions of the application; and a processor configured to execute the instructions of the application to generate on a display an identification of a system object relating to one of a plurality of building automation devices; receive a user input comprising a filter criterium for filtering a plurality of data points relating to the building automation devices; identify at least one of the plurality of data points of the building automation devices based on the filter criterium; integrate the identified at least one of the data points into the building controller to be associated with the system object; and generate on the display an identification of at least one of the integrated data points associated with the system object.

A third aspect of the present disclosure provides a non-transitory computer readable medium comprising instructions that when executed perform a method for integrating data points of one or more building automation devices in a building controller as described herein.

DETAILED DESCRIPTION

To facilitate an understanding of embodiments, principles, and features of the present disclosure, they are explained hereinafter with reference to implementation in illustrative embodiments. In particular, they are described in the context of being a method and system for integrating data points of one or more building automation devices into a building controller. Embodiments of the present disclosure, however, are not limited to use in the described systems or methods.

The components and materials described hereinafter as making up the various embodiments are intended to be illustrative and not restrictive. Many suitable components and materials that would perform the same or a similar function as the materials described herein are intended to be embraced within the scope of embodiments of the present disclosure.

Figure 1:
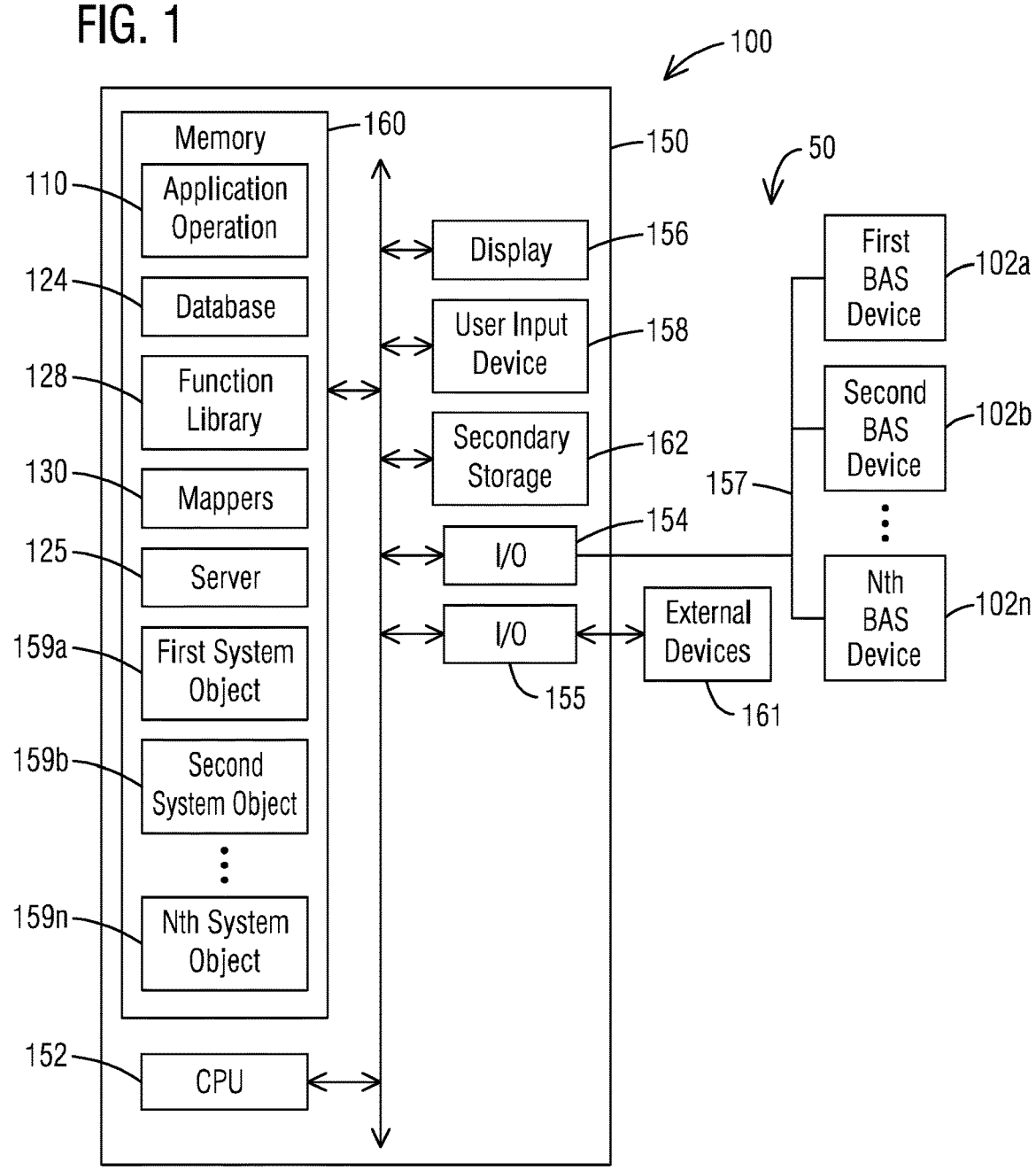
FIG. 1 illustrates a functional block diagram of a building management system and a building automation system in accordance with an exemplary embodiment of the present disclosure.

FIG. 1 illustrates a functional block diagram of a building management system 100 implemented in connection with a building automation system 50 in accordance with an exemplary embodiment of the present disclosure.

The system 50 includes a plurality of building automation system ("BAS") devices or subsystems 102a, 102b, 102n. The BAS devices/subsystems 102a, 102b, 102n may suitably be comfort (HVAC) system devices or subsystems, such as controllers, sensors, actuators, room control subsystems, air handling unit subsystems. Alternatively, or in addition, the BAS devices 102a, 102b, 102n may include life safety system devices or subsystems, security or devices or subsystems, lighting system devices, or other building system devices or subsystems. The BAS devices/subsystems 102a, 102b, 102n may also include building controllers or (decentralized) automation stations. As noted before, building controllers and automation stations are essentially purpose-built computers with input and output capabilities. Inputs and outputs can be either digital or analog. Building controllers/automation stations may be grouped in programmable logic controllers (PLCs), system/network controllers, and terminal unit controllers.

The management system 100 and BAS devices 102a, 102b, 102n form a comprehensive building automation system 50. The management system 100 and BAS devices 102a, 102b, 102n are operably connected to communicate via one or more data networks 157. The data networks 157 may comprise any conventional data communication network or combination of networks employed in building automation systems, such as Ethernet networks, ring networks or combinations thereof, and may include other networks such as the Internet. The management system 100 and network(s) 157 allow for management, monitoring and control of the BAS system devices 102a, 102b, 102n from a single point. In an embodiment, the management system 100 may be a building controller for controlling BAS devices/subsystems 102a, 102b, 102n and/or may include a building controller, e.g., building controller functionalities are integrated/incorporated into the building management system 100.

In an embodiment, the BAS devices 102a, 102b, 102n are configured as BACnet devices communicating via BACnet, i.e. the devices implement the BACnet protocol. BACnet is a communications protocol for building automation and control networks. The BACnet communications protocol provides mechanisms for computerized building automation devices to exchange information, regardless of the particular service they perform. For connection to a network, a BACnet device implements at least one of datalink and physical layer options defined for BACnet, with BACnet over IP being the dominant standard option today. The information accessible through this protocol is formatted as BACnet objects (which may be a system object 159a, 159b, 159n as defined herein) generated by processor performing the application operation of the management system 100. The set of standard and proprietary BACnet objects in a BACnet device represents the functionality of that device. Thus, the network(s) 157 may also comprise BACnet capabilities. It should be noted that one of ordinary skill in the art is familiar with BACnet communications protocol, elements and functionalities and thus BACnet will not be described in more detail herein.

As shown in FIG. 1, the management system 100 may be implemented in a commercially available computer or server (or building controller as described in further detail herein) 150 specifically configured as described herein. In this embodiment, the management system 100 includes a central processing unit and associated support circuitry (CPU) 152, at least first and second network input/output (I/O) units 154, 155, a display 156, a user input device 158, a primary memory 160, a secondary storage device 162, and a system bus 164. The CPU 152 is configured to execute programming instructions stored in the memory 160 to carryout various operations as described herein. In accordance with such instruction, the CPU 152 is configured to receive data inputs from the user input 158, generate display screens to be displayed on the display 156. The CPU 152 is also configured to communicate with external devices, such as the BAS devices 102a, 102b, 102n, via at least the first network I/O unit 154 and the network(s) 157. The CPU 152 is further configured to communicate with an external device 161 such as another computer, printer or data store, over one or more networks, via the second network I/O unit 155. To facilitate the above-described functionality, as well as other functionality, the CPU 152 is operably connected to each of network I/O units 154, 155, the display 156, the user input 158, the primary memory 160, and the secondary storage 162 via the system bus 164. The external device 161 may further include for example a client computer or client device, embodiment for example as a desktop computer, laptop computer, tablet or smartphone etc. Functionalities of the building management system 100, such as for example specific applications, may be executed via the management system 100 or via the client computer (external device 161). The client computer accesses the management system 100, wherein the client computer may communicate with the computer or server 150 via Internet or another network, e.g. Ethernet.

In this embodiment, the primary memory 160 stores programming instructions for a BAS application operation 110, a BAS database 124, a database server 125, a function library 128, and a function mapper 130. To this end, the primary memory 160 may include volatile memory such as random-access memory, as well as other types of readable and writeable memory. The BAS application operation 110 is one or more software programs that interface(s) to system data (in the database 124) to facilitate some aspect of managing, monitoring and controlling one or more of the BAS devices 102a, 102b, 102n. For example, the application operation 110 may suitably be a graphic element generator that generates on the display 156 graphical representation and/or identification of system objects 159a, 159b, 159n and/or values associated with system objects 159a, 159b, 159n. The operation 110 may further include or comprise command software that allows an application or user to generate command values for the devices 102a, 102b, 102n. Another example of the operation 110 is reporting software that can be used to generate reports of trends of values generated within the system 50.

The function library 128 includes a plurality of function definitions for BAS elements such as devices, assemblies, subsystems, and the like. Each function of the function library 128 is a data file, such an object data record, that provides a definition of common property-types and even common properties and other settings for a group of related objects. For example, a function data file can include a name or identifier, a list of properties for a temperature sensor that defines a uniform format, an icon and identifier used for temperature sensors, and a reference to a graphic definition that can be used to display a default graphic of a temperature sensor. Each function definition is configured to be employed by a processing unit executing corresponding software to provide generic output values based on the object type associated with the function.

Thus, for example, the CPU 152, in executing the BAS operation 110, can access data related to a particular system object 159a, 159b, 159n (e.g. associated with one of the devices 102a, 102b, 102n) through a generic function corresponding to the object type. In this manner, various system objects 159a, 159b, 159n (or values from system objects 159a, 159b, 159n) of different manufactures, models or configurations, but of the same type, may have a uniform way to present a data interface. Moreover, various system objects 159, 159b, 159n of the same type may employ the same "icon" in displays and utilize the same "graphic control" (i.e. graphic display configuration) without specifying such an icon or graphic control in the properties of each individual device.

The database 124 is a database containing active system values and data, as well as configuration data for the elements of the system, including configuration data for the BAS devices 102a, 102b, 102n and/or data points corresponding to such devices. For example, the database 124 includes present (or latest) values for the various data points of the system 50, including values (e.g. temperatures, set points, fan speed, etc.) of the devices 102a, 102, 102n. The database 124 can also include alarms or notifications and their corresponding statuses. The database 124 may further include system object configuration data.

System object configuration data includes a system object data record or instance for each object of the system. In particular, the building automation system 50 as described herein comprises a set of system objects 159a, 159b, 159n, such as for example BACnet objects. BACnet objects have specific properties, such as for example object name, object type, present value etc., required by the BACnet standard. System objects 159a, 159b, 159n may include, among other things, process values (i.e. outputs or inputs of a controller, sensor, valve, camera or the like), or nodes representative of groups of values, such as in a hierarchical definition. For example, a room object may have a temperature sensor output object, an air flow output object, or the like. A pump object may define a command value for the pump, a measured flow value for the pump, and other values. In general, each system object data record is a data file or other grouping or arrangement of data that includes identification values for a system object 159a, 159b, 159n, and references to measurement values related to the system object. 159a, 159b, 159n. System object data records may further include references to other system objects related to the system object. The objects of the system 50 also include devices, subsystems, as well as rooms, floors or buildings of the system 50. Each of such system objects 159a, 159b, 159n has its own object data record in the database 124.

Figure 2:
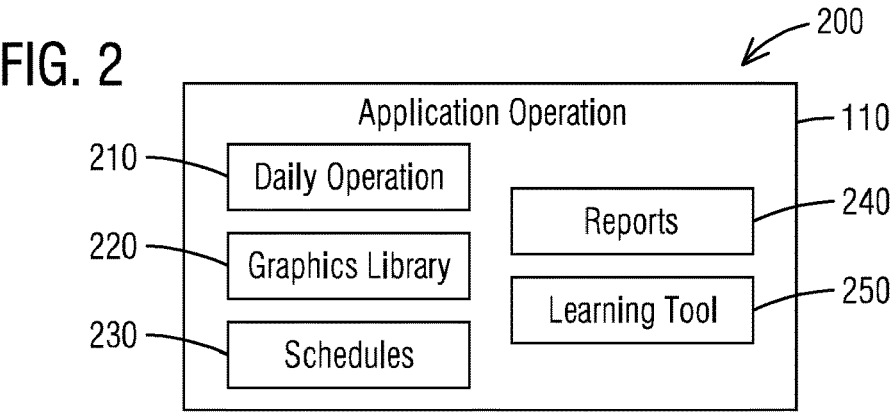
FIG. 2 illustrates a block diagram of an example of an application operation of a building management system in accordance with an exemplary embodiment of the present disclosure.

FIG. 2 illustrates a block diagram 200 of an example of a BAS application operation 110 of a building management system in accordance with an exemplary embodiment of the present disclosure. The building management system can be for example building management system 100 described in connection with FIG. 1.

As described before with reference to FIG. 1, BAS application operation 110 is one or more software programs that interface(s) to system data (for example in the database 124) to facilitate some aspect of managing, monitoring and controlling one or more of the BAS devices 102a, 102b, 102n. For example, the application operation 110 may suitably be a graphic element generator, that employs a Graphics Library 220 to generate on the display 156 applicable identifications or graphical representations of system objects 159a, 159b, 159n and/or values associated with system objects 159a, 159b, 159n. The operation 110 may further include or comprise command software that allows an application or user to generate command values for the devices 102a, 102b, 102n, including for example Daily Operations 210 and Schedules 230. Another example of the operation 110 is reporting software, see Reports 240, that can be used to generate reports of trends of values generated within the system 50. Further, application operation 110 may comprise a Learning Tool 250 for data point integration of one or more BAS devices 102a, 102b, 102n in a building controller.

As described before, database 124 (see FIG. 1) contains active system values and data, as well as configuration data for the elements of the system, including configuration data for the BAS devices 102a, 102b, 102n and/or data points corresponding to such devices. For example, the database 124 includes present (or latest) values for the various data points of the system 50, including values (e.g. temperatures, set points, fan speed, damper positions, heating coil valve position, cooling coil valve position, etc.) of the devices 102a, 102, 102n. These active systems values and data including data points are imported or added to the building management system 100 utilizing for example, a setup & service assistant software tool to configure, commission and maintain BAS devices on the building network within for example building automation system 50.

Data points from devices being monitored, such as for example an air-conditioning unit with sensor(s), or actuators for lighting, must be integrated to the operating and monitoring device, e.g., building controller or an automation station, so that the building controller or automation station can monitor and control the air-condition unit or lighting actuator. To integrate data points essentially means to assign and/or connect data points of a BAS device 102a, 102b, 102n to a control device, e.g. building controller and/or automation station, for monitoring and controlling purposes. Integration of data points may also include identification of data points of BAS devices 102a, 102b, 102n. The data points include present (or latest) values for the various points of the system 50, including values (e.g. temperatures, set points, fan speed, etc.) of the devices 102a, 102, 102n. The data points may further include configuration or identification values of the BAS devices 102a, 102b, 102n, or BACnet object values if the BAS devices 102a, 102b, 102n are configured and stored as BACnet objects within the building management system 100. The data points of BAS devices 102a, 102b, 102n are identified and stored in the database 124, for example when the BAS devices 102a, 102b, 102n are installed, herein also referred to as commissioned. The data points need to be assigned and/or connected with the respective building controller or automation station or the system objects 159a, 159b, 159n therein that correspond to the BAS devices, for monitoring and controlling purposes.

Figure 3:
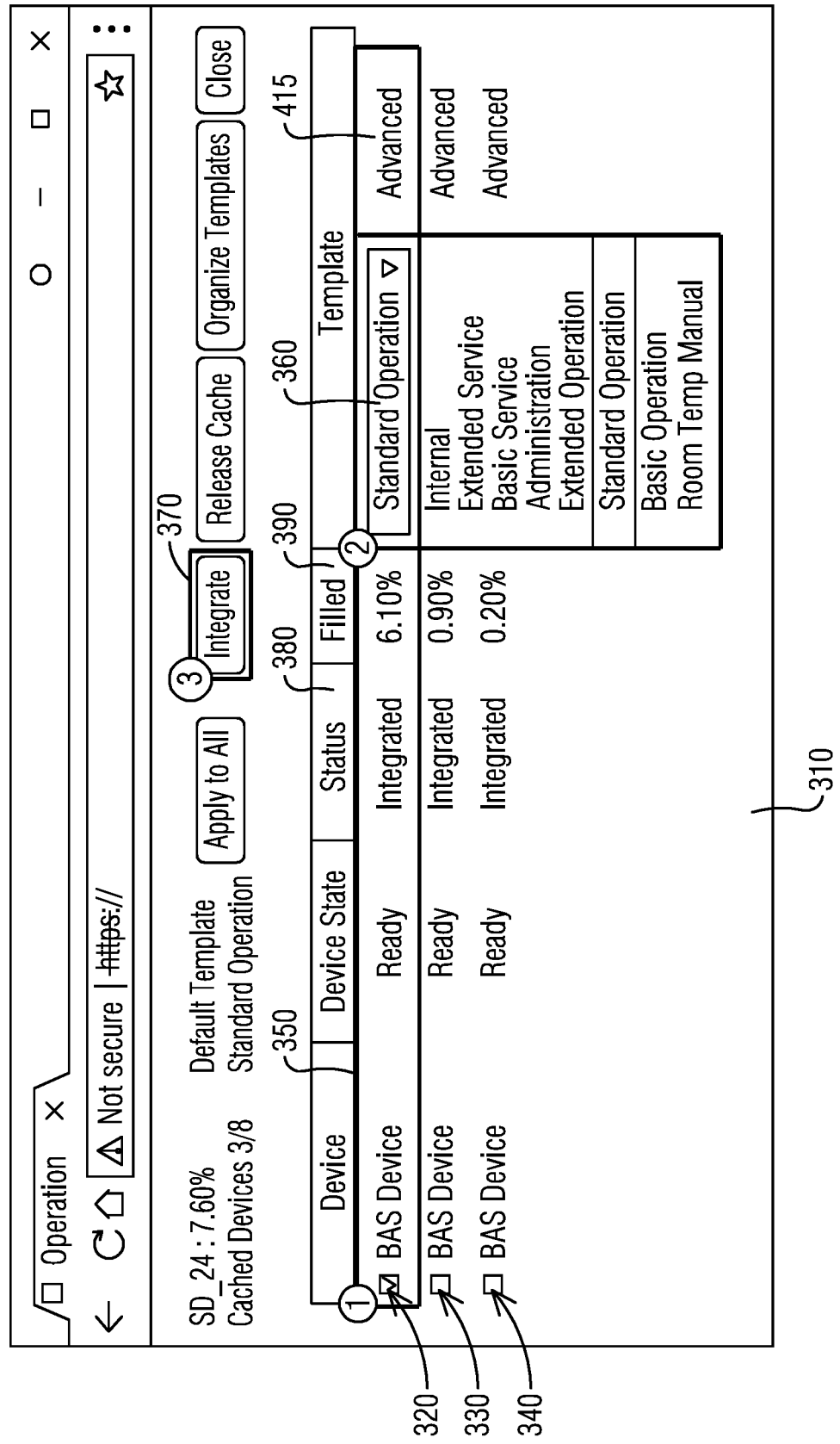
FIG. 3 illustrates a first screenshot of a display of a user interface device in connection with an automated integration of data points of one or more building automation devices in accordance with an exemplary embodiment of the present disclosure.

FIG. 3 illustrates a first screenshot 310 of a display 300 of a user interface device, also referred to as graphical user interface (GUI) provided by the management system 100 via the Learning Tool 250 application of the application operation 110, in connection with an automated integration of data points of one or more building automation devices, such as for example BAS devices 102a, 102b, 102n, into a building controller. A building controller may be a programmable logic controllers (PLC), system/network controller or terminal unit controllers, for monitoring and controlling BAS devices 102a, 102b, 102n. As described herein, the management system 100 may be employed in a building controller of the building automation system 50.

Within an application of building management system 100, for example application Learning Tool 250 (see FIG. 2), data points of BAS devices can be integrated into a building controller. Such an integration of data points can be manually, automated or a combination of both. As noted before, the data points are stored in database 124 of building management system 100. The integration of data points may be performed with building management system 100 directly or via a client device (see external device 161) in communication with the building management system 100. The Learning Tool 250 application can be for example a web-based application, wherein the application may be run inside a web browser and is accessed over a network, for example via the client device (e.g., external device 161).

In a first exemplary embodiment, screenshot 310 shows identifications of first BAS device 320, second BAS device 330 and third BAS device 340 generated via the web-based Learning Tool 250 application. First BAS device 320 may be for example an HVAC (heating, ventilation, air conditioning) sensor having two data points such as a cooling coil valve position and a heating coil valve position. Second BAS device 330 may be for example a room operating unit with a temperature sensor, a humidity sensor and an air quality sensor comprising three data points. Third BAS device 340 may be for example a presence and brightness sensors comprising two data points. A building controller may be for example an automation station with BACnet communication capabilities which can support and integrate thirty six (36) data points. It should be noted that there are many different types of BAS devices with different data points and may different types of building controllers which may support up to 2000 data points in one embodiment.

Before integration of data points via the Learning Tool 250 application, caching of respective BAS device(s) 320, 330, 340 is performed. Caching means that the operating and monitoring device(s), e.g., BAS device(s) 320, 330, 340, is/are loading objects into memory in preparation for data point integration. The memory may be a cache memory in the user interface device or in the management system 100.

After caching, data integration is performed. As screenshot 310 shows, first BAS device 320 is selected by a user for data point integration via the Learning Tool 250 (see section 350). After selection, a pre-defined integration level 360 can be selected by the user via a drop down menu provided by the management system 100 via the Learning Tool 250. For example, an extended operation or a standard operation with respect to the selected BAS device 320 can be selected and identified to the management system 100 for further processing. The pre-defined integration levels can be based on user function. Based on user function means that there may be different types of users with different (access) levels or functions with respect to the application 110 of the management system 100. For example, an engineer level may comprise different integration levels than a technician level. In this example, standard operation for selected BAS device 320 is chosen. Finally, data point integration of the BAS device 320 is performed by the management system 100 in response to receiving an integrate activating command, e.g., clicking respective field 'Integrate' 370 of the user interface device display 300. The data points are identified and integrated automatically via the Learning Tool 250 of the management system 100 based on the selected integration level 360 assigned to the building structure, i.e. a respective building controller. After integration, the status field 380 provided by the management system 100 indicates that BAS device 320 is integrated. Field 'Filled' 390 provided by the management system 100 indicates a percentage of the integrating device (building controller) capacity used by this device.

Figure 4:
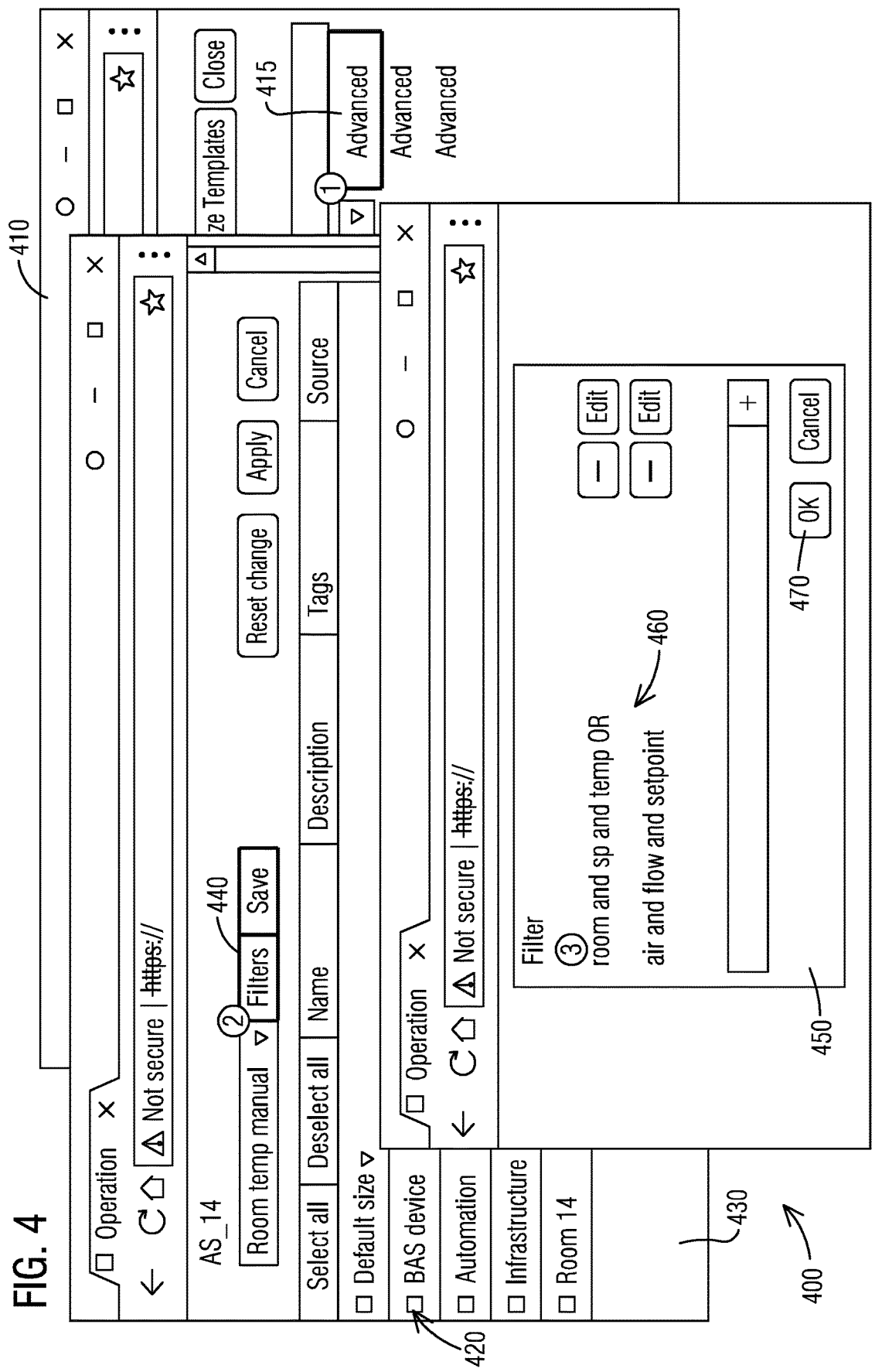
FIG. 4 illustrates a set of screenshots of a display of a user interface device in connection with an automated integration of data points of one or more building automation devices in accordance with an exemplary embodiment of the present disclosure.

FIG. 4 illustrates a set of screenshots 400 of a display 300 of a user interface device provided by the management system via the Learning Tool 250 application of the application operation 110 in connection with an automated integration of data points of one or more building automation devices. Instead of integrating data points for a specific selected BAS device as described in connection with FIG. 3, the embodiment of FIG. 4 illustrates an automated integration of data points utilizing a template and filter.

For a templated-based automated data point integration, the management system 100 may receive a user initiated click or select option 'Advanced' 415 illustrated in screenshots 410, 310. In the embodiment shown in FIG. 4, screenshot 410 is consistent with screenshot 310 of FIG. 3, where first BAS device 320 is selected with respect to data point integration (corresponds to BAS device 420 of FIG. 4). In response to receiving a selection of the option 'Advanced' 415, the management system 100 provides a new window corresponding to screenshot 430. Within the window illustrated in screenshot 430, a user may select the icon 'Filters' 440 to cause the management system 100 via the Learning Tool 250 to create a template with one or more filters. In this embodiment, in response to receiving the selection of the icon 'Filters' 440, the management system 100 provides a new window corresponding to screenshot 450.

The method for a template-based data point integration includes the management system 100 creating a template comprising at least one filter 440, wherein the at least one filter 440 comprises a filter criterium 460 for a selection/identification of data points relating to one or more BAS devices. In an exemplary embodiment, the filter criterium 460 is defined using tags or keywords assigned to the one or more building automation devices. The data points of the one or more BAS devices to be integrated can comprise a BACnet object, and wherein the data points comprise one or more values of the BACnet object. As noted before, one of ordinary skill in the art is familiar with BACnet and associated BACnet objects and functionalities as described in the BACnet standard but not with the template-based data point integration techniques described herein. When the BAS devices comprise BACnet communication capabilities, the filter criterium 460 can be defined based on Haystack tags using Haystack filter syntax. Haystack is a software tool and methodology employed by the application operation 110 or specifically the Learning Tool 250 to define the meaning of BAS device data or tagging data points associated with the building automation devices for further processing by the management system 100, such as processing by the operation application 110 or Learning Tool 250.

In an exemplary embodiment, the filter criterium 460 is defined by the management system 100 using Haystack tags. The filter criterium 460 is created by management system 100 as prompted by the user via the user interface device of the system 100 as described herein. In our example, as illustrated in screenshot 450, filter criterium 460 comprises: 'room AND sp AND temp OR air AND flow AND setpoint' where the terms "AND" and "OR" are interpreted as Boolean operators for tags "room", "sp", "temp", "air", "flow" and "setpoint". In this embodiment, the management system 100 via the Learning Tool 250 recognizes the Boolean operators and tags to mean that data points of all BAS devices that comprise tags as defined in the filter criterium 460 are integrated in the respective building controller. In our example, all cached BAS devices that comprise tags 'room AND sp AND temp' OR 'air AND flow AND setpoint' will be automatically integrated in the respective building controller by the management system 100. In response to receiving the user activation of field 'OK' 470, the user prompts the Learning Tool 250 of the management system 100 to proceed to data point integration by clicking field 'Integrate' 370, see FIG. 3. After the template with at least one filter 440 comprising the filter criterium 460 has been generated by the system 100, the data points of the one or more BAS devices are automatically selected and integrated by the Learning Tool 250 application in the respective building controller.

Figure 5:
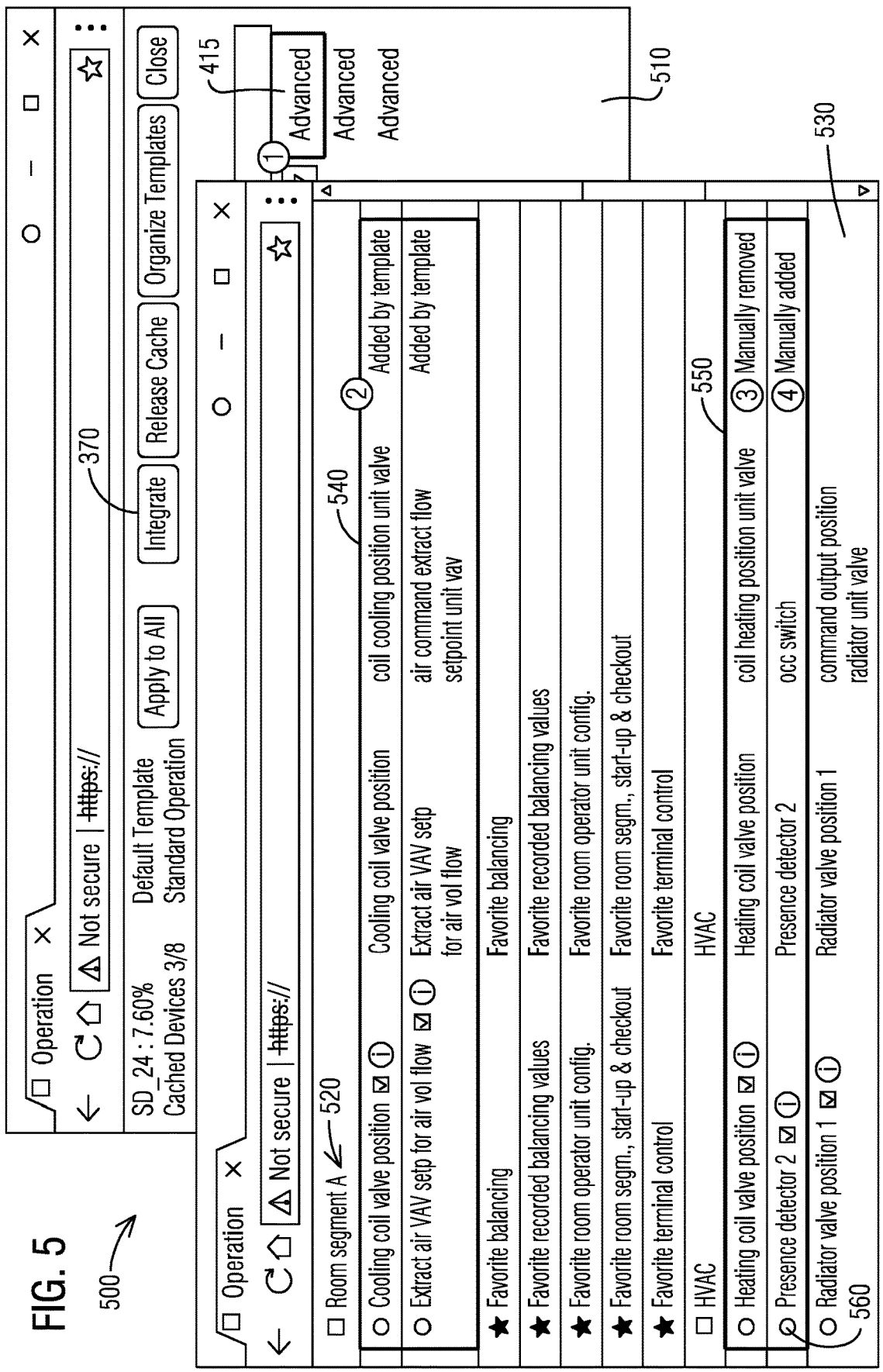
FIG. 5 illustrates a further set of screenshots of display of a user interface device in connection with an automated integration of data points of one or more building automation devices in accordance with an exemplary embodiment of the present disclosure.

FIG. 5 illustrates a further set of screenshots 500 of display 300 of a user interface device provided by the management system via the Learning Tool 250 application of the application operation 110 in connection with an automated integration of data points of one or more building automation devices. The embodiment of FIG. 5 illustrates a combination of automated and manual integration of data points of BAS devices presented by the management system 100 in response to performing the template-based data point integration process as further described herein.

For a manual data point integration by an end user of the application (Learning Tool 250), the management system 100 receives a user activation or selection of the option 'Advanced' 415 illustrated on screenshot 510. It should be noted that screenshot 510 is consistent with screenshot 410 of FIG. 4, where BAS device 420 is selected with respect to data point integration performed by the system 100. In response to receiving the selection of the option 'Advanced' 415, the management system 100 provides a new window corresponding to screenshot 530. Within window or screen 530, the management system 100 enables the user to view objects (BAS devices) automatically selected by the system 100 based on selected integration level 360, such as depicted in the embodiment shown in FIG. 3, where the 'Standard operation' was selected for the integration level 360. 'Room segment A' 520 is the building structure component that was previously assigned to BAS device 320, 420 (see FIG. 3 and FIG. 4). Section 540 identifies the data points of the system objects 159a, 159b, 159n that have been added by a template, which means data points have been integrated by the Learning Tool 250 of the management system 100 from the database of data points corresponding to the building automation devices based on template and filter 440. Section 550 of screenshot 530 identifies the data points of the system objects 159a, 159b, 159n that are manually removed or manually added using the management system 100. For example, the data point corresponding to the 'coil heating position unit valve' was manually removed after it was previously integrated by the system 100, for example using a template in accordance with the present disclosure. Further, 'occ switch' data point has been manually integrated to the building structure. Such manual excluding or including of system objects may be performed by the management system 100 as prompted by the user by checking or unchecking a box 560 assigned to the respective object (BACnet object).

In another exemplary embodiment of the present disclosure, a generated template with at least one filter 440 and filter criterium 460 may be saved or stored in a memory, for example in a memory of the user interface device of the management system 100. Such a saved template may then be applied to multiple other BAS devices within the building management system 100. Furthermore, such a saved template may be exported from the building management system 100 and/or user interface device for use in another building management system.

Figure 6:
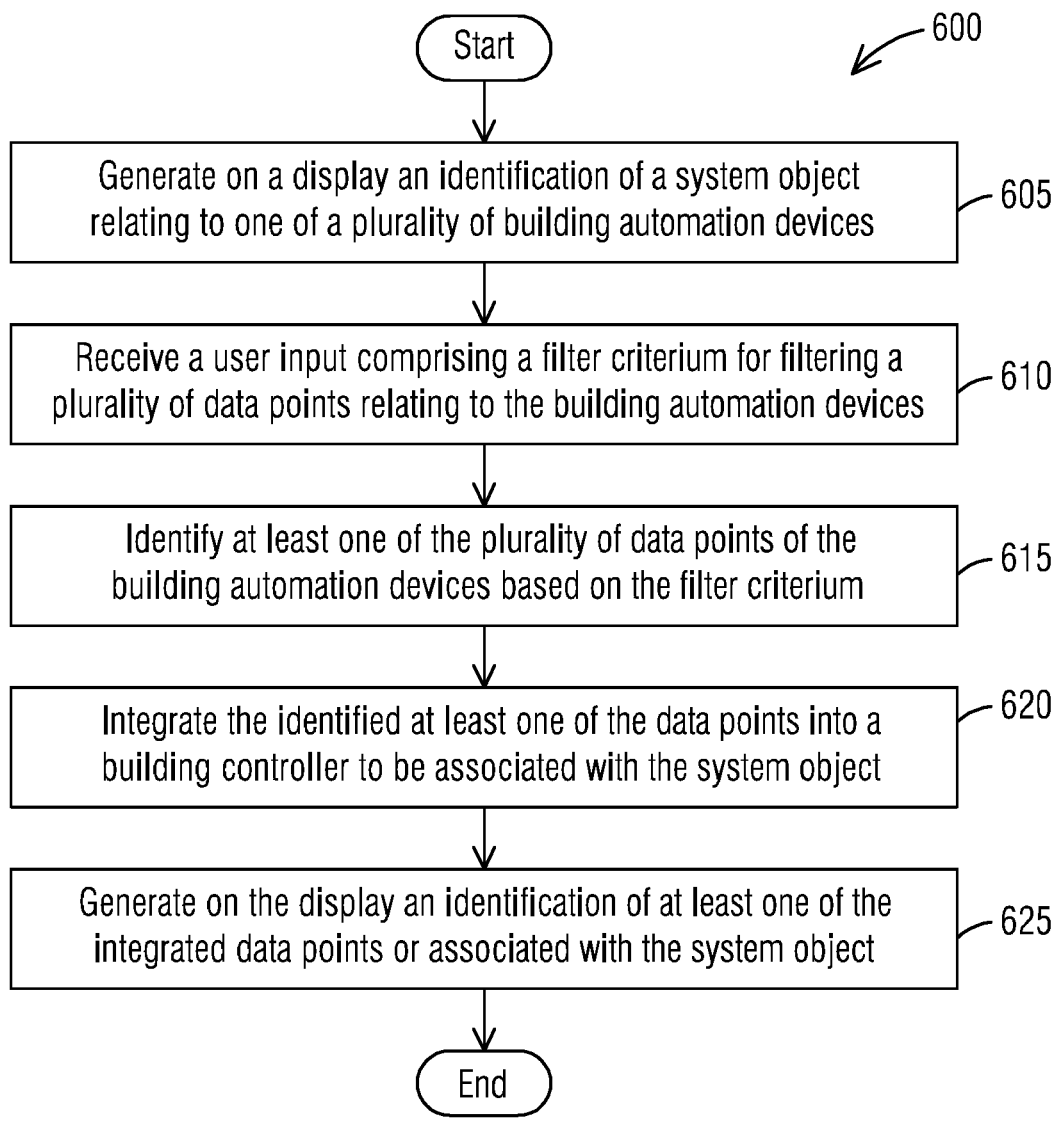
FIG. 6 illustrates a flow chart of a method for integrating data points of one or more BAS devices into a building controller in accordance with an exemplary embodiment of the present disclosure.

FIG. 6 illustrates a flow chart of a method for integrating data points of one or more BAS devices into a building controller. The flow chart is consistent with the previously described components and elements in connection with FIG. 3, FIG. 4 and FIG. 5. The method may be performed, for example, in one or more data processing systems, such as for example the building management system 100 (see FIG. 1), configured to perform acts described below, referred to in the singular as 'the system'. The method may be implemented by executable instructions stored in a non-transitory computer-readable medium that cause one or more data processing systems to perform such a method. For example, the Learning Tool 250 application may comprise the executable instructions to perform such a method. For example, the executable instructions of the Learning Tool 250 application may be stored in memory 160 of the building management system 100.

The method begins with the system 100 generating on a display 300 an identification of a system object 159a, 159b, 159n relating to one of a plurality of building automation devices 102a, 102b, 102n (step 605). The system 100 receives a user input comprising a filter criterium 460 for filtering a plurality of data points relating to the building automation devices (step 610). The system identifies at least one of the plurality of data points of the building automation devices based on the filter criterium 460 (step 615). In an embodiment, the identifying of data points comprises identifying tags or keywords assigned to the building automation devices 102a, 102b, 102n, specifically system objects 159a, 159b, 159n of the BAS devices 102a, 102b, 102n.

In step 620, the system integrates the identified at least one of the data points into a building controller to be associated with the system object, which means that the identified data points are virtually integrated into the respective building controller, for example assigned or connected to the system objects, for monitoring and controlling purposes of the building automation device(s). Before integration of data points, the system may receive a user input comprising a selection or command to perform data point integration (see 370 in FIG. 3). In step 625, the system generates on the display 300 an identification of at least one of the integrated data points associated with the system object.

In an exemplary embodiment, the method may further comprise generating on the display 300 an identification of a pre-defined integration level 360 and receiving a user input comprising a selection of an integration level. The method may further comprise receiving a user input comprising a filter criterium based on Haystack tags and Haystack filter syntax.

In another exemplary embodiment, the method may further comprise storing the template comprising the filter criterium 460 in a memory of the building automation system. For example, the template comprising the filter criterium 460 may be stored in memory 160 of the building management system 100.

In another exemplary embodiment, the method may further comprise receiving a user input comprising a selection or command to export or transmit the template comprising the filter criterium 460 and exporting the template comprising the filter criterium 460 from the system 100 to a further computing device. Such a further computing device may be for example another building management system or a client computer.

In another exemplary embodiment of the method, the system may receive a user input comprising a selection or command to exclude previously integrated data points, and then disconnects or excludes the previously integrated data points from the building controller and generates on the display 300 an identification of disconnected or excluded data points.

In another exemplary embodiment of the method, the system may receive a user input comprising a selection or command to integrated further data points of a further building automation device into the building controller. The system then integrates the further data points of the further building automation device into the building controller and generates on the display an identification of the further integrated data points.

The method and system for data point integration provides auto-integrate data points based on engineered access levels to provide coarse filtering of all possible data points of a given building automation system 50. Further, the method and system present discovered data points via a display of a user interface device (GUI) to an end user, for example an engineer or technician to confirm or override (for example manually include or exclude) coarse level discovered data points for integration. Also, the method and system allow users to define a tag-based query to filter all possible data points to further improve coarse filtering.

The provided method and system speed up commissioning of a building automation system, allow portability across different building controllers, for example by exporting a template with a filter from one management system to another management system, and allow discovery and integration of third-party devices by using the template-based integration option for data point monitoring.

While embodiments of the present methods and systems have been disclosed in exemplary forms, it will be apparent to those skilled in the art that many modifications, additions, and deletions can be made therein without departing from the spirit and scope of the claimed inventions and its equivalents, as set forth in the following claims.

The invention claimed is:

1. A method for integrating a plurality of data points of a plurality of building automation devices into a building controller within a building management system, comprising:
through operation of at least one processor in the building management system configured via executable instructions included in at least one memory:
generating on a display an identification of a system object relating to one of a plurality of building automation devices;
receiving a user input for a template-based automated integration including a filter criterium for filtering the plurality of data points relating to the building automation devices;
generating a template comprising the filter criterium for filtering the plurality of data points;
automatically identifying at least one of the plurality of data points of the plurality of building automation devices based on the template comprising the filter criterium;
automatically integrating the identified at least one of the plurality of data points into the building controller to be associated with the system object; and
generating on the display an identification of at least one of the integrated data points associated with the system object, and further comprising
generating on the display an identification of a pre-defined integration level, wherein the pre-defined integration level is based on user function; and
receiving a user input comprising a selection of an integration level,
wherein the at least one data point of the plurality of data points is identified and integrated automatically via a learning tool of a management system of the building automation system, based on the selected integration level.

2. The method of claim 1, wherein the identifying of the at least one of the plurality of data points comprises identifying a tag or a keyword assigned to the plurality of building automation devices.

3. The method of claim 1, further comprising:
receiving a user input comprising a filter criterium based on Haystack tags and Haystack filter syntax.

4. The method of claim 1, further comprising:
storing the template comprising the filter criterium in a memory of the building management system.

5. The method of claim 1, further comprising:
receiving a user input comprising a selection or command to export or transmit the template comprising the filter criterium; and
exporting or transmitting the template comprising the filter criterium from the building management system to a further computing device.

6. The method of claim 1, further comprising:
receiving a user input comprising a selection or command to disconnect or exclude previously integrated data points;
disconnecting or excluding the previously integrated data points from the building controller; and
generating on the display an identification of disconnected or excluded data points.

7. The method of claim 1, further comprising:
receiving a user input comprising a selection to integrate a further data point of a further building automation device into the building controller;

integrating the further data point of the further building automation device into the building controller; and
generating on the display an identification of the further integrated data point.

8. The method of claim 1, wherein the system object comprises a BACnet object, and wherein the data points comprise one or more values of the BACnet object.

9. The method of claim 1, wherein the plurality of building automation devices comprise a sensor device and/or an actuator device monitored and controlled by the building controller.

10. A non-transitory computer-readable medium storing instruction that when executed by a processor perform a method for integrating data points of building automation devices into a building controller as claimed in claim 1.

11. A system for integrating a plurality of data points of a plurality of building automation devices into a building controller within a building management system comprising:
a storage device comprising an application;
an accessible memory comprising instructions of the application; and
a processor configured to execute the instructions of the application to:
generate on a display an identification of a system object relating to one of a plurality of building automation devices;
receive a user input for a template-based automated integration comprising a filter criterium for filtering the plurality of data points relating to the building automation devices;
generate a template comprising the filter criterium for filtering the plurality of data points;
automatically identify at least one of the plurality of data points of the plurality of building automation devices based on the template comprising the filter criterium;
automatically integrate the identified at least one of the plurality of data points into the building controller to be associated with the system object; and
generate on the display an identification of at least one of the integrated data points associated with the system object,
wherein the processor is further configured to execute the instructions of the application to:
generate on the display an identification of a pre-defined integration level, wherein the pre-defined integration level is based on user function; and
receive a user input comprising a selection of an integration level,
wherein the at least one data point of the plurality of data points is identified and integrated automatically via a learning tool of a management system of the building automation system, based on the selected integration level.

12. The system of claim 11, further comprising:
a database storing the data points of the plurality of building automation devices.

13. The system of claim 11, wherein the system object comprises a BACnet object, and wherein the data points comprise one or more values of the BACnet object.

14. The system of claim 11, wherein the processor is further configured to execute the instructions of the application to:
identify a tag or keywords assigned to the plurality of building automation devices.

15. The system of claim 11, wherein the processor is further configured to execute the instructions of the application to:
receive a user input comprising a filter criterium based on Haystack tags and Haystack filter syntax.

16. The system of claim 15, wherein the processor is further configured to execute the instructions of the application to:
identify Haystack tags assigned to the plurality of building automation devices.

17. The system of claim 11, wherein the plurality of building automation devices comprise a sensor device and/or an actuator device monitored and controlled by the building controller.

* * * * *